United States Patent
Adams

(10) Patent No.: US 7,788,531 B2
(45) Date of Patent: Aug. 31, 2010

(54) GENERATION OF BACKING ELECTRIC CURRENT ON THE BASIS OF A COMBINATION OF COMPONENTS

(75) Inventor: Mary Louise Adams, Ellijay, GA (US)

(73) Assignee: Cove Distribution, Inc., Coral Springs, FL (US)

( * ) Notice: Subject to any disclaimer, the term of this patent is extended or adjusted under 35 U.S.C. 154(b) by 434 days.

(21) Appl. No.: 11/983,886

(22) Filed: Nov. 13, 2007

(65) Prior Publication Data

US 2009/0037768 A1    Feb. 5, 2009

(51) Int. Cl.
    *G06F 11/00* (2006.01)
(52) U.S. Cl. .......................................... 714/14; 714/22
(58) Field of Classification Search ........................ None
    See application file for complete search history.

(56) References Cited

U.S. PATENT DOCUMENTS

| | | | | |
|---|---|---|---|---|
| 4,884,242 A | * | 11/1989 | Lacy et al. .................. | 365/229 |
| 5,230,074 A | * | 7/1993 | Canova et al. ................ | 714/14 |
| 5,781,448 A | * | 7/1998 | Nakamura et al. .......... | 700/293 |
| 5,809,315 A | * | 9/1998 | Ohtsuka ....................... | 713/323 |
| 5,923,099 A | * | 7/1999 | Bilir ............................. | 307/64 |
| 5,958,054 A | * | 9/1999 | O'Connor et al. ........... | 713/300 |
| 7,051,233 B2 | * | 5/2006 | Fukumori et al. ............. | 714/14 |
| 7,222,246 B2 | * | 5/2007 | Pomaranski et al. ........ | 713/300 |
| 7,406,623 B2 | * | 7/2008 | Takahashi et al. ............. | 714/14 |
| 2002/0199131 A1 | * | 12/2002 | Kocin .......................... | 714/14 |
| 2008/0010514 A1 | * | 1/2008 | Liu ............................... | 714/14 |
| 2008/0244310 A1 | * | 10/2008 | Hara ............................ | 714/14 |

\* cited by examiner

*Primary Examiner*—Michael C Maskulinski
(74) *Attorney, Agent, or Firm*—Husch Blackwell Sanders Welsh Katz

(57) ABSTRACT

This descriptive document is about a new backup device that takes advantage of the components of a PC's conventional power supply and it combines them with additional typical electronic components from an uninterruptible power supply (UPS). The result of such combination is a lower cost backup function that is applied directly to the PC and, therefore, eliminates the requirement of external devices—such as a UPS—to perform this backup function.

In this document, the electronic components that combine with the PC's power supply in order to provide the backup functionality described above are referred to as integrated backup unit (URI).

21 Claims, 3 Drawing Sheets

GENERATION OF BACKING ELECTRIC CURRENT ON THE BASIS OF A COMBINATION OF COMPONENTS

CROSS-REFERENCE TO RELATED APPLICATION

This application claims priority of Venezuelan Patent Application No. 1643-07 filed Jul. 31, 2007.

Please replace the prior submitted substitute specification (November 8, 2007) with the substitute specification as follows:

FIELD OF THE INVENTION

The subject invention relates to personal computers and more specifically to a backup power supply for a personal computer.

TECHNICAL BACKGROUND

It is well known that the personal computer (PC) plays a main role as work's everyday tool. For the PC to be functional, all its components (including processor, storage drives, and memory) must receive power. This power comes from the commercial electric outlet (120 VAC).

When a sudden AC power failure occurs, the components of the PC stop working, causing the typical inconveniences associated with the loss of information or even physical damage to the components. The popular uninterruptible power supply (UPS) was created to address this issue. The role of a UPS is to generate backup AC power to maintain the components of the PC when an AC power failure is detected on the commercial power grid. To accomplish its backup functionality, a UPS contains several elements. The most important elements are: batteries, battery chargers, and voltage converters.

Based on the type of technology used, a UPS can have High or Low frequency, and in all known cases, the connection to the PC is external, i.e., the UPS is attached to the AC outlet and the PC is connected to the UPS.

SUMMARY OF THE INVENTION

The subject invention relates to a new backup device that takes advantage of the components of a PC's conventional power supply and combines them with additional typical electronic components from an uninterruptible power supply (UPS). The result of such a combination is a lower cost backup function that is applied directly to the PC and, therefore, eliminates the requirement of external devices—such as a UPS—to perform this backup function. The electronic components that combine with the PC's power supply in order to provide the backup functionality described above are referred to as an integrated backup unit (URI).

CONCISE DESCRIPTION OF THE DRAWINGS

DESCRIPTION OF AN EMBODIMENT OF THE INVENTION

Figure 1:
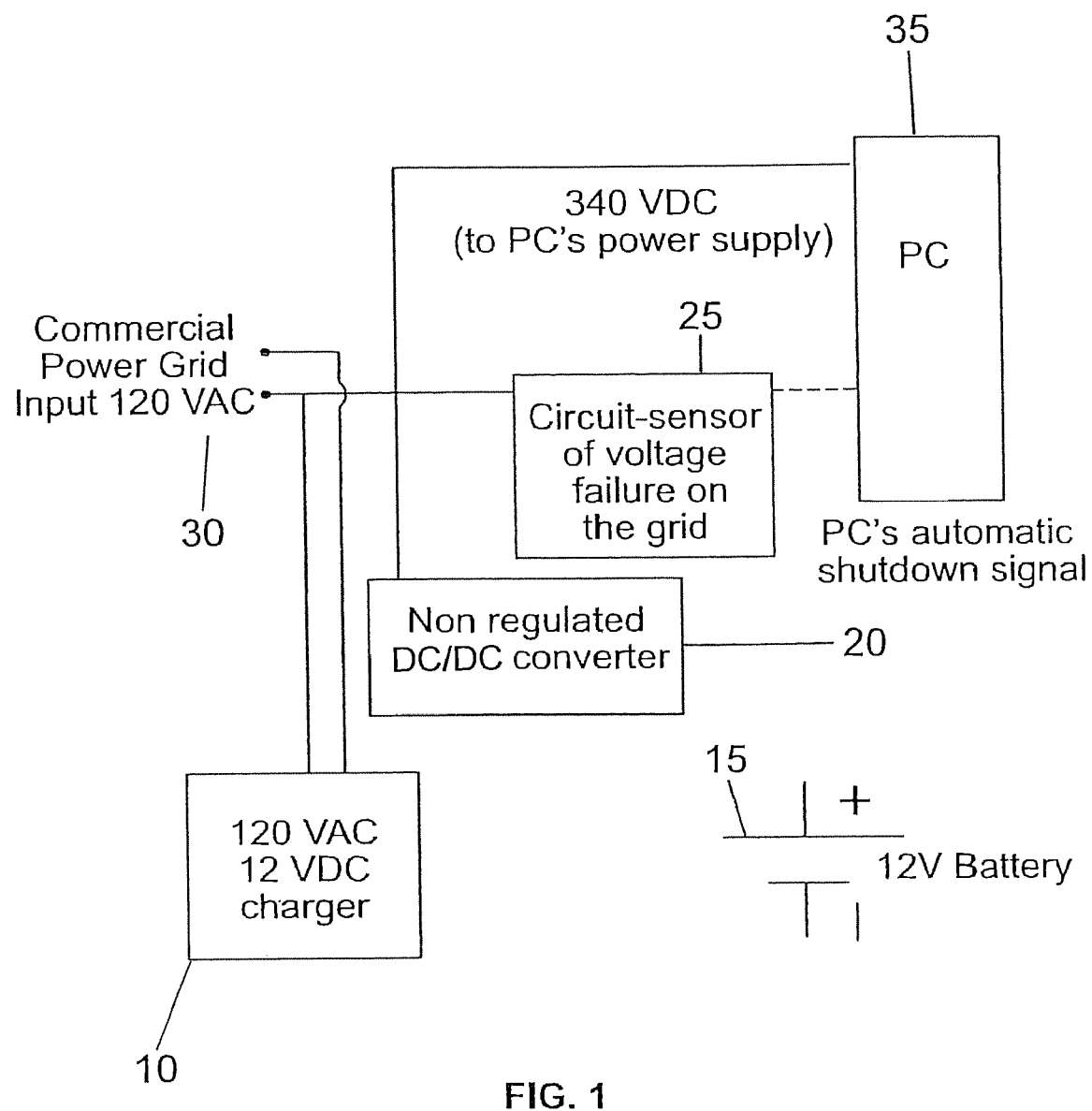
FIG. 1 shows a schematic diagram of the Integrated Backup Unit (URI containing its four components and its interconnections in accordance with an illustrated embodiment of the invention.
Figure 2:
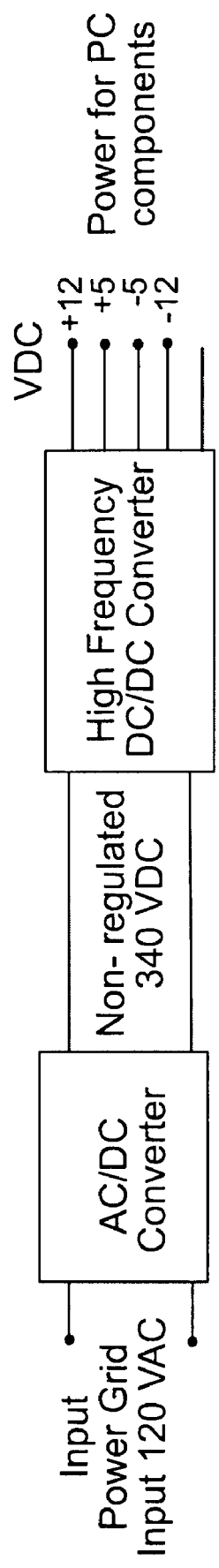
FIG. 2 illustrates a power supply of a personal computer.
Figure 3:
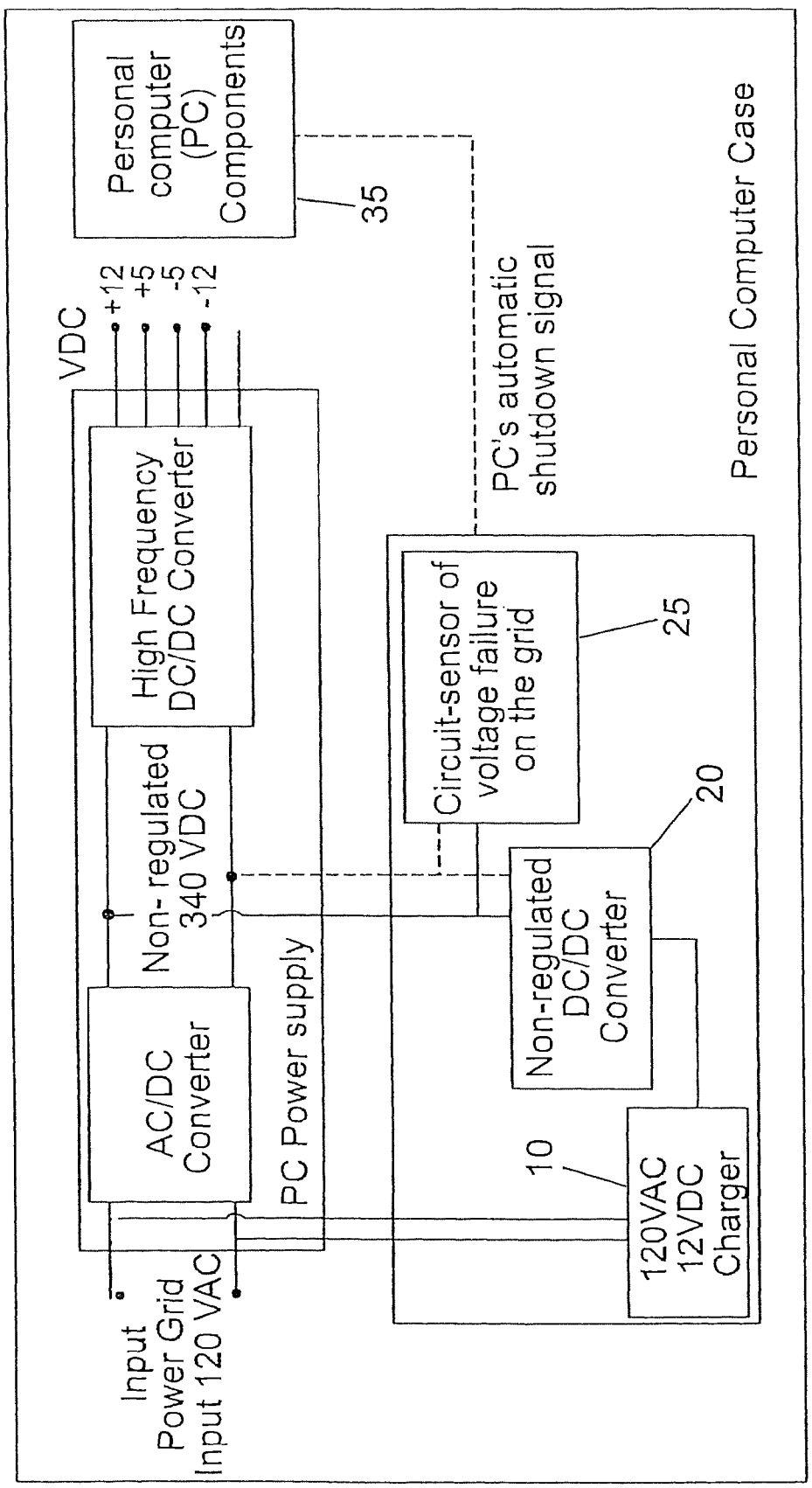
FIG. 3 is a schematic of the URI connected to the personal computer in accordance with an illustrated embodiment of the invention.

The integrated backup unit (URI) is shown in the FIGURE and it has 4 main elements: 1) A battery charger 10 of 120 VAC to 12 VDC; 2) A 12-V battery 15; 3) A DC/DC voltage converter 20; 4) A circuit 25 which detects voltage failures on the power grid outlet (120 VAC).

The battery charger 10 uses AC power directly from the 120-V electrical outlet 30 after it is connected to it. The charger output (12 VDC) then connects to the 12-volt battery 15. As long as there is voltage in the power grid outlet, the battery 15 will be charged permanently by the charger 10.

Voltage from the 12-volt battery 15 is then increased to a voltage of 340 VDC by the DC/DC converter 20. The converter's output is not regulated; therefore, it can have a voltage fluctuation of about 15%. As explained below, this non-regulated voltage has the appropriate characteristics to be combined with the PC's power supply in order to provide the desired backup functionality.

The circuit-sensor 25 of voltage failures on the power grid outlet (120 VAC) is the fourth and last component in the integrated backup unit (URI). Its role is sending an electronic signal to the personal computer 35 when a voltage failure occurs. This signal will cause the PC to start a predefined process of automatic shutdown.

The relationship of the URI with the PC's power supply will now be described. The basic components of a the power supply of a PC are two voltage converters: 1) an AC/DC converter capable of handling input voltages of 120 VAC or 240 VAC, and non-regulated output voltage of 340 VDC; and 2) a DC/DC converter which transforms output voltage from the AC/DC converter into the 4 voltages required by the PC components (+5, −5, +12, −12 VDC).

A common characteristic of a PC's power supply is that the input AC voltage can vary up to a 20% of its input rating without causing the regulated voltages from the DC/DC converter's output to go above or below their ratings. This implies that the DC voltage at the AC/DC converter's output, with a rating of 340 VDC, can range from 280 to 400 VDC without causing problems at the DC/DC converter's output. The power supply is designed to tolerate these variations resulting from the defects of the power grid.

The non-regulated output from the AC/DC converter from the PC's power supply is the connecting point with the integrated backup unit (URI). While connecting the DC/DC converter's output from the URI to this connecting point, the PC's power supply can deliver its four output voltages even when there is no power from the power grid. Because the power supply's AC/DC converter will stop working when there is no power on the power grid, this role will be immediately taken over by the integrated backup unit's (URI) DC/DC converter 20. This will keep the PC components powered while the PC performs its automatic shutdown routine.

In short, to fulfill its backup role, the integrated backup unit (URI) needs to access the AC/DC converter's output from the PC's power supply, which means DC/DC converter's input of the power supply.

The signal for automatic shutdown of the PC is obtained through the standard ports of the computer, either serial, or USB, and does not require any modification.

The invention claimed is:

1. A personal computer operating from a power grid, the person computer having an AC to DC converter that receives, as an input, unregulated AC power from the power grid and provides unregulated DC power at a nominal DC voltage; a first DC to DC converter that receives unregulated DC power from the AC to DC converter at the nominal DC voltage and converts the unregulated DC power to a plurality of regulated DC voltage, said personal computer comprising:
   a battery; and
   a second DC to DC converter that converts a DC voltage of the battery to the nominal DC voltage and supplies power to the first DC to DC converter and to a processor of the personal computer through the first DC to DC converter upon failure of the power grid.

2. The personal computer as in claim 1 further comprising a power loss detector that detects failure of the power grid and activates the second DC to DC converter in response to the failure of the power grid.

3. The personal computer as in claim 2 further comprising a computer shut down signal transferred from the power loss detector to the computer in response to the failure of the power grid.

4. The personal computer as in claim 3 wherein the shut down signal further comprising a serial or USB format.

5. The personal computer as in claim 1 further comprising a battery charger that charges the battery from the power grid.

6. The personal computer as in claim 1 wherein the nominal DC voltage further comprises 340 volts.

7. The personal computer as in claim 1 wherein the nominal DC voltage further comprises 240 to 400 volts DC.

8. The personal computer as in claim 1 wherein the plurality of output voltages further comprises plus and minus five volts and plus and minus twelve volts.

9. The personal computer as in claim 1 wherein the unregulated AC power from the power grid further comprises 120 VAC input.

10. The personal computer as in claim 1 wherein the unregulated AC power from the power grid further comprises 240 VAC input.

11. In a personal computer operating from, a power grid having an AC to DC converter that receives, as an input, unregulated, AC power from the power grid and provides unregulated DC power at a nominal DC voltage and a first DC to DC converter that receives unregulated DC power from the AC to DC converter at the nominal DC voltage and converts the unregulated DC power to a plurality of regulated DC voltage levels, wherein the improvement comprises: a battery; and a second DC to DC converter that converts a DC voltage of the battery to the nominal DC voltage and supplies power to the first DC to DC converter and to a processor of the personal computer through the first DC to DC converter upon failure of the power grid.

12. The personal computer as in claim 11 further comprising a power loss detector that detects failure of the power grid and activates the second DC to DC converter in response to the failure of the power grid.

13. The personal computer as in claim 12 further comprising a computer shut down signal transferred from the power loss detector to the computer in response to the failure of the power grid.

14. The personal computer as in claim 13 wherein the shut down signal further comprising a serial or USB format.

15. The personal computer as in claim 11 further comprising a battery charger that detects charges the battery from the power grid.

16. The personal computer as in claim 11 wherein the nominal DC voltage further comprises 340 volts.

17. The personal computer as in claim 11 wherein the nominal DC voltage further comprises 240 to 400 volts DC.

18. The personal computer as in claim 11 wherein the plurality of output voltages further comprises plus and minus five volts and plus and minus twelve volts.

19. The personal computer as in claim 11 wherein the unregulated AC power from the power grid further comprises 120 VAC input.

20. The personal computer as in claim 11 wherein the unregulated AC power from the power grid further comprises 240 VAC input.

21. A personal computer operating from a power grid, the personal computer including an AC to DC converter that receives, as an input, unregulated AC power from the power grid and provides unregulated DC power at a nominal DC voltage; a first DC to DC converter that receives unregulated DC power from the AC to DC converter at the nominal DC voltage and converts the unregulated DC power to a plurality of regulated DC voltage, the personal computer further comprising:
   a battery;
   a second DC to DC converter that converts a DC voltage of the battery to the nominal DC voltage and supplies power to the first DC to DC converter and to a processor of the personal computer through the first DC to DC converter upon failure of the power grid; and
   a power loss detector that detects failure of the power grid, activates the second DC to DC converter in response to the failure of the power grid and sends a shut down signal to the computer to initiate a shut down procedure in response to the failure.

\* \* \* \* \*